Nov. 16, 1954        A. GABARDI        2,694,604
DISK WHEEL COVER FOR MOTOR CAR WHEELS
Filed June 29, 1950
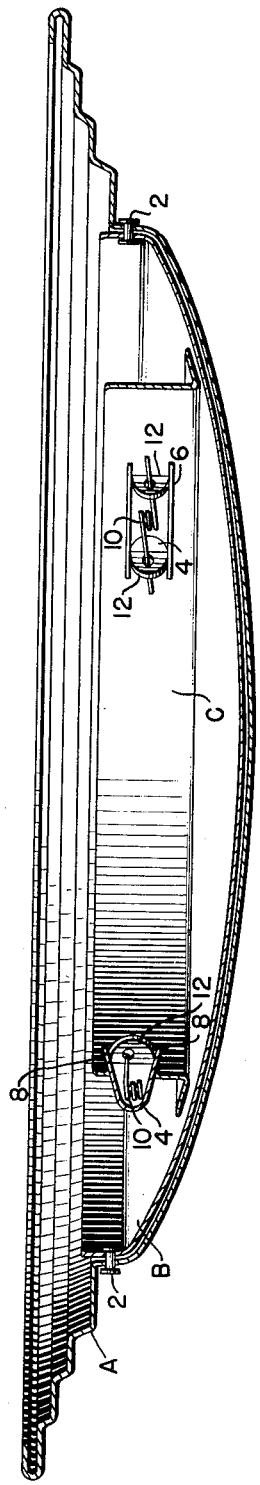
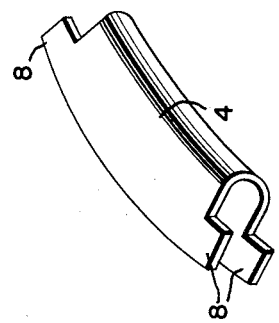
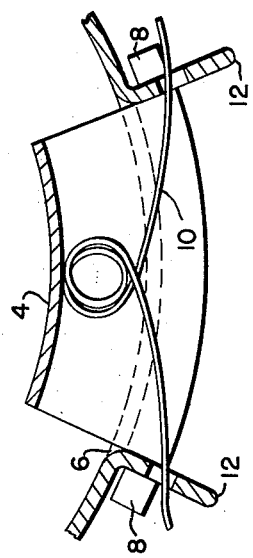
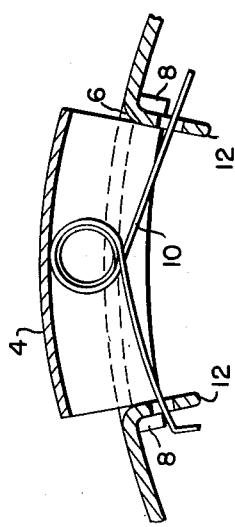
INVENTOR
ARTURO GABARDI

United States Patent Office 2,694,604
Patented Nov. 16, 1954

2,694,604

DISK WHEEL COVER FOR MOTORCAR WHEELS

Arturo Gabardi, Milan, Italy

Application June 29, 1950, Serial No. 170,982

Claims priority, application Italy July 2, 1949

3 Claims. (Cl. 301—37)

The present invention relates to hub caps for the wheels of motor vehicles.

It is an object of the present invention to provide means facilitating the rigid securement of a hub cap to a vehicle wheel in a manner wherein the hub cap does not rattle and is not liable to be accidentally lost.

It is another object of the present invention to provide means permitting easy and rapid securement of a hub cap to a vehicle wheel and subsequent disengagement of the hub cap from the vehicle wheel.

It is a still further object of the present invention to provide means rendering it possible to readily remove a hub cap from a supported position on a vehicle wheel.

With the above and other objects in view, the invention will be hereinafter more fully described and the combination and arrangement of parts will be shown in the accompanying drawings and pointed out in the claims which form part of the specification.

Fig. 1 is a diagrammatical section of the hub cap constructed according to the present invention;

Fig. 2 is an enlarged fragmentary sectional view showing an exterior locking member forming a part of the hub cap of the present invention;

Fig. 3 is an enlarged fragmentary sectional view showing an interior locking member forming a part of a modified form of a hub cap constructed according to the present invention; and Fig. 4 is a perspective view of the locking member illustrated in Fig. 2.

Referring now to the drawings, the wheel cover A is provided with an internal guard B which is connected to the cover A by means of rivets 2. Within the cover B is a cylindrical crown or internal rim C which is provided with openings or slots 6 at spaced intervals about its periphery.

Mounted within each opening 6 is a U-shaped locking member which includes spaced legs interconnected by a bight or curved portion. Each of the locking members 4 is disposed radially of the rim C and has its legs in bearing engagement with the adjacent walls or bounding portions of the respective opening or slot 6 to mount the locking member for sliding movement from an inoperative position to an operative position with the bight projecting outwardly of the rim C.

Suitable lug means 8 are carried by the legs of the locking members 4 and are engageable with the rim C in the operative position (Fig. 2) to limit sliding movement of the respective locking members out of said operative position and away from said rim.

Operatively connected to each of the U-shaped locking members 4 is a helically wound spring 10 which has an intermediate portion bearing against the bight of the locking member 4 and has its ends secured to ears 12 arranged on both sides of the slot 6.

Thus, by pressing the cover A against the car wheel, the U-shaped locking members slide radially inwardly within the respective openings 6 against the springs 10, and then spring back to the normal or operative position to lock the hub cap to the wheel. Accordingly, the hub cap can be fitted on to the wheel or removed therefrom by a simple pressure or pulling action.

To withdraw or remove the hub cap, a pull is exerted on a hooked tool (not shown), after having inserted the tool in the axial holes of the rivets or bushings 2.

The ears 12 can be secured to rim C by welding or by stamping out and forming the plate material of rim C.

In Fig. 3, there is shown a modified form of the present invention in which the bight portion of the respective U-shaped locking members 4 project inwardly of the rim or crown C.

While several embodiments of the invention have been shown and herein described, it will be understood that the same is capable of modifications without departure from the general scope and spirit of the invention as defined in the claims.

Having thus described the invention, what is claimed as new and desired to be secured by Letters Patent, is:

1. A hub cap for covering a wheel of a motor vehicle, comprising a hub cap body including an internal cylindrical crown, the latter being provided with at least one opening, at least one U-shaped locking member arranged radially of said crown and mounted within said opening for sliding movement, a pair of ears carried by said crown adjacent said opening, and a spring in the form of a wire having its ends secured to said ears and having an intermediate portion bearing against and within said locking member for biasing the latter into a predetermined position.

2. A hub cap for covering the wheels of a motor vehicle, comprising a hub cap body including an internal cylindrical crown, said crown being provided with at least one opening, at least one U-shaped locking member including spaced legs, interconnected by a curved part, said curved part projecting radially of said crown and said legs being in engagement with the bounding portion of said opening to slidably mount said locking member on said crown, a pair of ears carried by said crown adjacent said opening, and a spring secured to said ears and radially bearing against the curved part of said locking member for biasing the latter into a predetermined position.

3. A hub cap for the wheel of a vehicle, comprising a hub cap body including an internal crown, said crown being provided with a plurality of slots at spaced intervals about the periphery thereof, a plurality of substantially U-shaped locking members each including legs interconnected by a bight, said locking members being respectively arranged within said slots with the legs of each locking member in engagement with the bounding portion of the respective slots and mounting said locking member for sliding movement from an inoperative position to an operative position, lug means carried by the legs of each locking member and engaging said rim in said operative position to limit sliding movement of the respective locking members out of said operative position in a direction away from said inoperative position, and spring means operatively connected to each locking member for biasing same into said operative position.

References Cited in the file of this patent

UNITED STATES PATENTS

| Number | Name | Date |
|---|---|---|
| 681,667 | Call | Aug. 7, 1901 |
| 1,814,409 | Reid | July 14, 1931 |
| 1,830,415 | Wittenberg | Nov. 3, 1931 |

FOREIGN PATENTS

| Number | Country | Date |
|---|---|---|
| 771,880 | France | Aug. 6, 1934 |